United States Patent [19]

Fuerst et al.

[11] Patent Number: 4,659,140
[45] Date of Patent: Apr. 21, 1987

[54] VEHICLE ROOF

[75] Inventors: Arpad Fuerst, Munich; Bernhard Wingen, Feldkirchen, both of Fed. Rep. of Germany

[73] Assignee: Webasto-Werk W. Baier GmbH & Co., Fed. Rep. of Germany

[21] Appl. No.: 844,561

[22] Filed: Mar. 27, 1986

[30] Foreign Application Priority Data

Mar. 27, 1985 [DE] Fed. Rep. of Germany ....... 3511031
Dec. 23, 1985 [DE] Fed. Rep. of Germany ....... 3545869

[51] Int. Cl.$^4$ .......................... B60J 7/057; F16H 57/10
[52] U.S. Cl. ..................................... 296/223; 296/216; 296/217; 74/764
[58] Field of Search ............... 296/216, 223, 217, 222; 74/764, 765

[56] References Cited
U.S. PATENT DOCUMENTS 3,266,328 8/1966 Rott .

FOREIGN PATENT DOCUMENTS 1946161 3/1971 Fed. Rep. of Germany ...... 296/222
78828 5/1983 Japan ................................... 296/222

Primary Examiner—Robert B. Reeves
Assistant Examiner—Dennis H. Pedder
Attorney, Agent, or Firm—Sixbey, Friedman & Leedom

[57] ABSTRACT

Vehicle having a cover arrangement which, in a closed position, covers a roof opening. The cover arrangement is movable by way of an actuating mechanism, having a minimum of two synchronized members, with differeing speed ratios, which are connected to a single primary drive. For transmitting the primary drive to the members to be moved, there is a reversible distributor gear assembly which has a plurality of gear elements. The distributor gear assembly has one input shaft and a minimum of two output shafts which, based upon the relative position of the gear elements of the distributor gear assembly can be individually actuated or jointly actuated via the gear elements with differing transmission ratios.

23 Claims, 17 Drawing Figures

VEHICLE ROOF

BACKGROUND AND SUMMARY OF THE INVENTION

This invention relates to vehicle roof having a cover arrangement which, in a closed position, closes a roof opening and which is displaceable from the closed position by means of an actuating mechanism which has a minimum of two drive members to be driven either simply or together, differing with speeds, connected to a single primary drive.

A known vehicle roof of this kind (German Offenlegungsschrift No. 32 11 519) provides a roof in the manner of a so-called spoiler roof. The cover of this roof is upwardly tiltable about a front pivot bearing that is supported by a sliding carrier element which is displaceable in the longitudinal vehicle direction. Additionally, for producing the tilting of the cover, a lift arm is provided that is pivotably mounted at one end for rotation around a stationary axis in the area of the side edge of the roof opening, while, at an opposite end, the lift arm is hingedly connected to a sliding member which, in turn, is displaceable in the longitudinal direction of the cover. The primary drive for the cover is operatively connected with a threaded cable which displaces a drive block in the longitudinal direction of the vehicle. The drive block can be connected, via automatic on/off clutch mechanisms, with either the sliding carrier supporting the front cover pivot bearing, with a connecting rod which tilts the lift arm via a connecting link guide, or can be separated from these elements, respectively. The clutch mechanisms and the elements of the actuating mechanisms cooperating therewith, are disposed in the side portion of the roof frame and are exposed and visible when the cover is open. Thus, these components are disposed in that portion of the roof area which is exposed to dirt and corrosion, making them subject to weathering and increased wear. The solution provided in the known patent overcome these problems requires a rather expensive construction. It is practically impossible to optimally coordinate the various motion sequences as to their respective speeds, particularly with regard to a gradual tilting movement, and in contrast thereto, a rapid movement of the cover.

Similar problems are faced in another known spoiler roof (German Pat. No. 29 42 006) where a first threaded cable can be operatively connected with the mechanisms for longitudinal displacement and tilting of the cover via couplings, or can be disengaged therefrom, respectively, and in which the cover takes along a second threaded cable which is operatively connected with the cover tilting mechanism when the cover is displaced, thereby causing the first drive cable to be released from the cover tilting mechanism.

The invention, therefore, has a principal object to provide a vehicle roof of the kind mentioned above, having a relatively simple, reliable and sturdy drive mechanism, which simultaneously permits any desired speed synchronization of the cover arrangement movements during the various tilting phases.

The objective of the invention is achieved, in accordance with preferred embodiments, by providing a reversible distributor gear assembly in a predetermined relative position to the drive elements between the primary drive and the elements to be displaced, which distributor gear assembly has an input shaft and a minimum of two output shafts which, depending upon the relative position of the distributor gear assembly gears can be actuated separately or jointly by the gear elements with different transmission ratios.

The distributor gear assembly can be located at a protected area, e.g., below the fixed roof surface and in front of the forward edge of the roof opening, where it is removed from the area of the roof which is exposed to weathering. The distributor gear assembly easily permits an optimal selection of the speed graduations necessary for the displacement motions of the cover arrangement. It is to be understood that any desired primary drive can be provided, e.g. a crank handle drive or an electric motor drive.

A particularly compact and sturdy construction is achieved when, in a further development of the invention, the distributor gear assembly is a planetary drive, preferably a dual epicyclic gear arrangement, having two coaxially arranged sun gears and two groups of planet pinions which are freely, rotatably mounted at one planet carrier. It is especially advantageous when both sun gears are connected with the primary shaft in a manner fixed against relative rotation for enabling torque to be transmitted from the primary shaft to the sun wheels, one output shaft being disposed coaxially with the input shaft and connected with the plant carrier of one planet pinion group in a torque transmissable manner. The plant pinions of both planet pinion groups appropriately mesh with the internal toothing of an internally and externally toothed outer ring gear, and the drive of the remaining output shaft is derived from the external toothing of the outer ring gear, preferably by a gear meshing with the external toothing of the outer ring gear, which gear is connected with the remaining output shaft in a torque transmissable manner. An appropriate selection of the tooth number ratios of the various pinions permits a complete presetting of each rotational speed ratio desired for the two output shafts.

The reversing of the distributor gear assembly can be effected by a reversing device, whereby alternatively the outside pinion or the planet carrier of the other planet pinion group is blocked from rotating. The reversing device appropriately has a blocking arrangement which selectively can be brought into engagement with locking elements located at the outer ring gear or at the planet carriers of the other planet pinion groups, at a predetermined mutual rotational position of the external gear and this planet carrier. A manual reversing of the distributor gear assembly can be provided, or alternatively, a reversing device for autommatic reversing of the distributor gear assembly, upon reaching the predetermined relative position, can be provided.

The cover arrangement may consist of individual or multiple parts. For instance, the vehicle roof may be a spoiler roof or a sliding and lifting roof with a one-piece cover, in which the tilting device of the cover operatively coacts with one of the output shafts, and the cover displacement device operatively coacts with one of the other output shafts. The output shafts, however, can also be utilized for the displacement of two or more cover parts, e.g. in the case of a sliding roof with a wind deflector forming part of the roof surface when inoperative.

These and further objects, features and advantages of the present invention will become more obvious from the following description when taken in connection

DETAILED DESCRIPTION OF THE PREFERRED EMBODIMENTS

Figure 1:
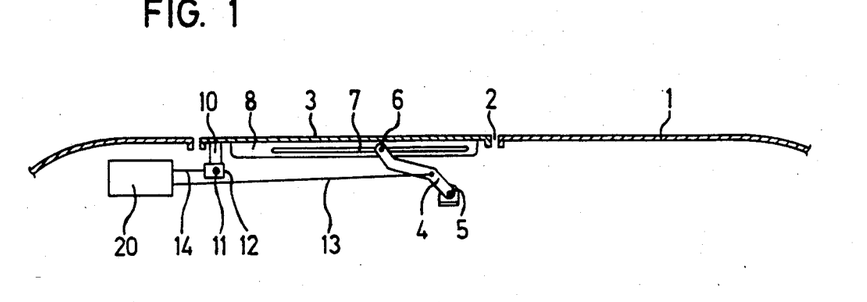
FIGS. 1-3 show a spoiler roof, having a distributor gear assembly, in different cover positions.
Figure 2:
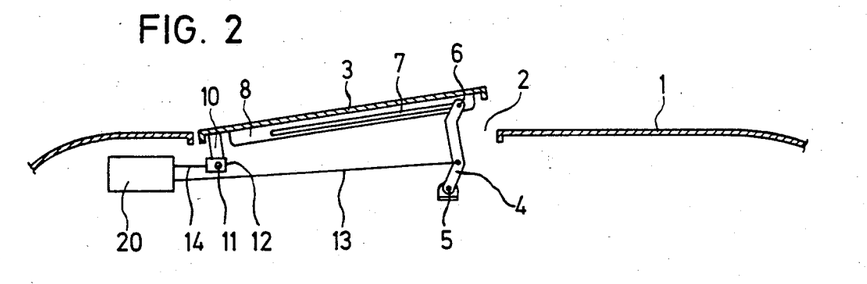
Figure 3:
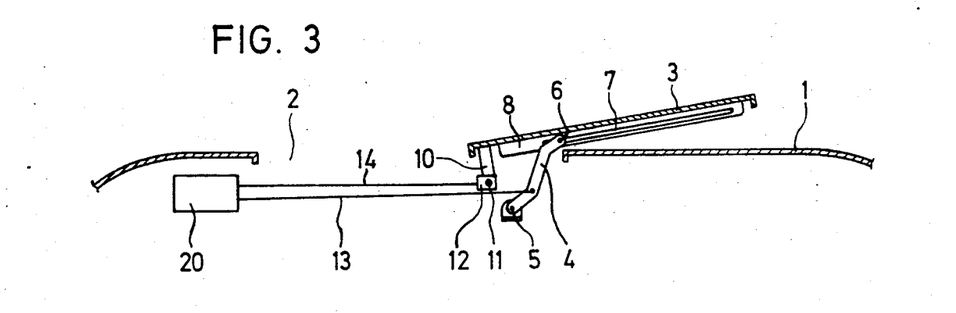

In the spoiler roof depicted in FIGS. 1 to 3, a roof opening 2 is disposed in a fixed roof surface 1. In its closed, FIG. 1, position, cover 3 closes a roof opening 2. A seal for sealing the gap between the edge of the roof opening 2 and cover 3, as well as other conventional structural details of the vehicle roof have been eliminated, for clearer illustration.

A lifting lever 4 is provided at each side of cover 3, near the rear end of roof opening 2. Only one of these lifting levers is depicted in FIGS. 1-3. Lifting lever 4 is pivotable, at one end, around a bearing 5, which is stationary with regard to roof surface 1. An opposite end of lever 4, that is spaced apart from bearing 5, is hingedly connected to cover 3 via a pivot pin 6. Pivot pin 6 is displaceable in a selector guide slot 7 of a guide rail 8 that extends in a longitudinal direction along the underside of the cover 3. Cover carriers 10 are disposed near the front edge of cover 3, at both sides of the cover, only one of which is depicted. Cover carrier 10 is hingedly connected to a sliding carriage 12 via hinge 11, which carriage is slidable in a fixed guide rail, not depicted, in the longitudinal direction of the vehicle.

The tilting movement of lifting lever 4 around bearing 5 is induced by a threaded cable 13, while a threaded cable 14 is provided for the displacement of sliding carriage 12. Corresponding threaded cables 13' and 14' lead to the lifting lever and the sliding carriage on the opposite side of cover 3. Threaded cables 13, 13', 14, 14' engage pinions 16, 17 (FIG. 7) which are respectively positioned on output shafts 18, 19 of a distributor gear assembly 20 so as to be rotated with rotation thereof. Distributor gear assembly 20 has an input shaft 21, which is operatively connected with a primary drive, e.g., a crank handle 22, or an electric motor.

For the purpose of tilting cover 3 from the closed position according to FIG. 1 into the FIG. 2 position, only threaded cables 13, 13' are displaced, while threaded cables 14, 14' are retained. A displacement of threaded cables 13, 13' causes lift levers 4 to be tilted in a clockwise direction, as depicted in FIGS. 1 and 2. Appropriately, this tilting movement is a relatively gradual one, so as to accurately and safely control intermediate positions of cover 3 inbetween the closed FIG. 1 position and the fully extended FIG. 2 position. Once cover 3 has reached the position according to FIG. 2, and cover 3 is to be displaced rearwardly, starting from such position, there is a shifting motion of both threaded cables 13, 14 (and correspondingly, also of threaded cables 13' and 14') via distributor gear assembly 20 toward the position shown in FIG. 3. Sliding carriage 12 and, along with it, cover 3 are moved rearwardly in the longitudinal direction of the vehicle via threaded cable 14. At the same time, threaded cable 13 causes the gradual further tilting of lifting lever 4 in a clockwise direction, in order to keep the tilting angle of cover 3 relatively small, or, if appropriate, in order to tilt cover 3 until it reaches a position which is nearly parallel to the fixed roof surface 1.

Figure 4:
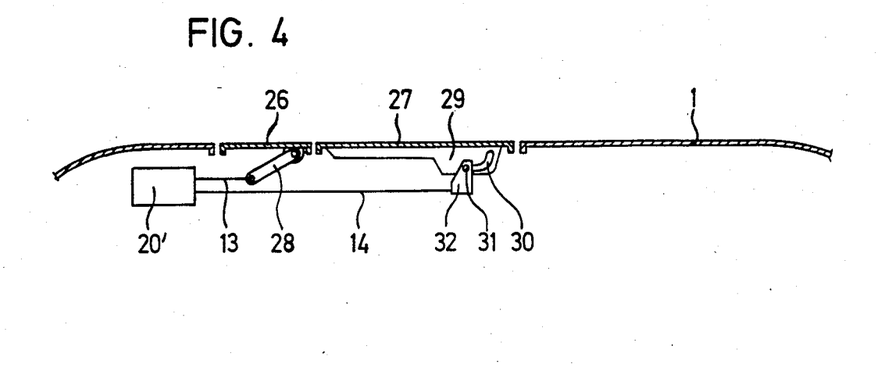
FIGS. 4-6 show a vehicle roof with two cover parts, operated by a distributor gear assembly, in different operating positions.
Figure 5:
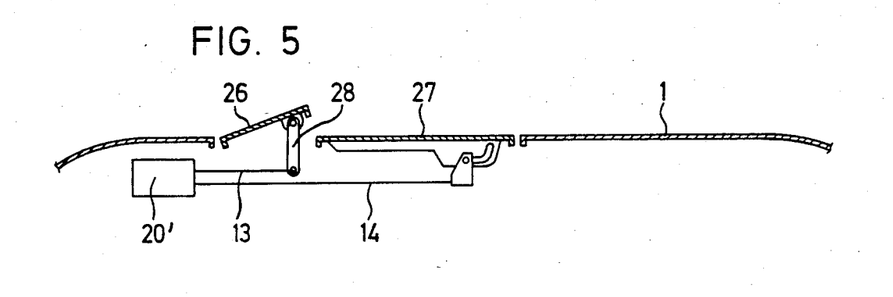
Figure 6:
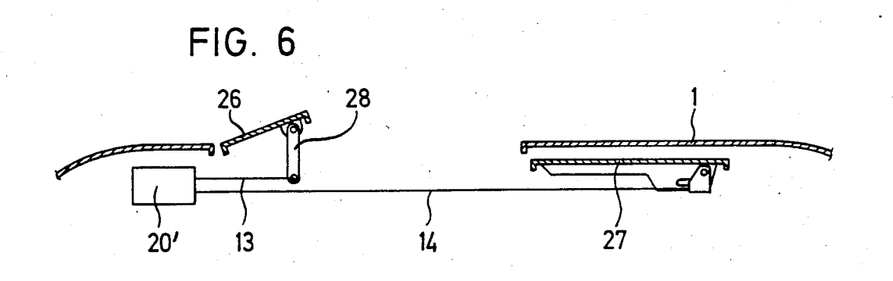

FIGS. 4-6 depict a vehicle roof havig a cover comprising two cover parts 26, 27. Front cover part 26, which can be used as a wind deflector, is hingedly connected to a lift lever 28 whose end facing away from cover part 26 is operatively connected with threaded cable 13. A retaining bracket guide 29, having link slot 30, is disposed at the underside of rear cover part 27. A connecting pin 31 of a sliding carriage 32, that is displaceable in the longitudinal direction of the vehicle, travels by way of threaded cable 14 in link slot 30. It is to be understood that elements corresponding to elements 28 and 32 are also located on the opposite side of the cover and are operatively connected with threaded cables 13', 14'.

For the purposes of ventilating the passenger compartment, front cover part 26 can be tilted via distributor gear assembly 20' and threaded cable 13, in the manner depicted in FIG. 5, while the rear cover part 27 remains in its closed position. Starting from the FIG. 5 position of cover parts 26, 27, rear cover part 27 can then be lowered in the manner of a conventional sliding roof via distributor gear assembly 20' and threaded cable 14, and then moved under the fixed roof surface 1, whereby cover part 26 remains tilted as a wind deflector (FIG. 6).

In this modification of the vehicle roof, in a first phase (transition from FIG. 4 position to the FIG. 5 position) only threaded cable 13 and (corresponding threaded cable 13') are displaced. In a later movement phase, during the transition from the FIG. 5 position to the FIG. 6 position, there is only, or practically only, a displacement of threaded cables 14, 14' subsequent to the switch-over of distributor gear 20' assembly.

Figure 7:
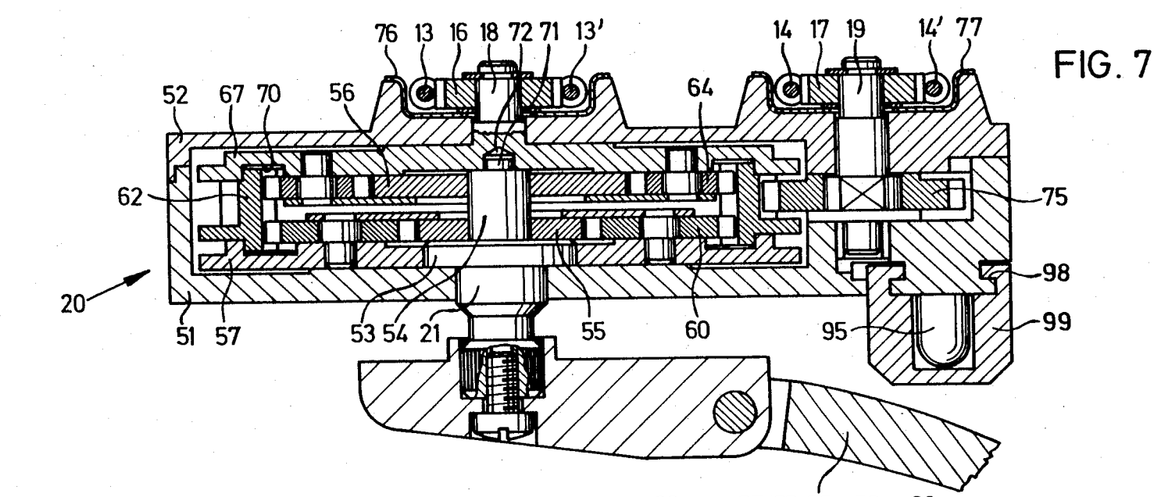
FIG. 7 shows a cross section through an example of a distributor gear assembly.
Figure 8:
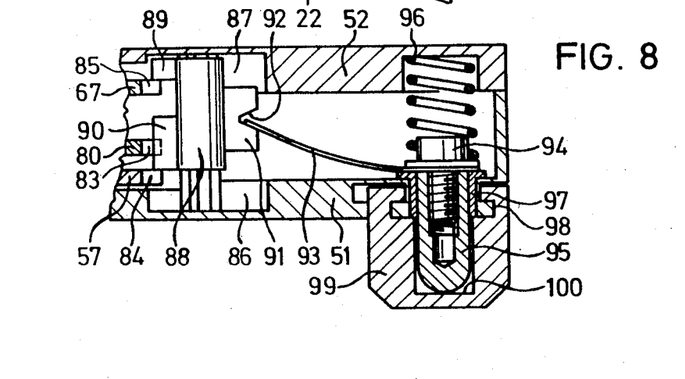
FIG. 8 shows a partial section of the distributor gear assembly depicting a manual reversing device.

The distributor gear assembly 20, depicted in greater detail in FIGS. 7 and 8, has a lower housing part 51 and an upper housing part 52. Input shaft 21 is rotatably mounted in lower housing part 51. Input shaft 21 supports itself on the bottom of lower housing part 51 by way of a cylindrical flange 53. An element 54 of input shaft 21 projects upwardly from flange 53 has flat sides 54 (FIG. 9) by which a keyed connection for transmission of rotational movement is formed with a lower sun gear 55 and an upper sun gear 56. A lower planet carrier 57 is mounted in a freely rotatably manner on flange 53.

Planet carrier 57 has three bearing bores 58 for supporting bolts 59 that are radially offset with respect to the axis of input shaft 21 and are uniformly circumferentially distributed. Supporting bolts 59 and lower planet pinions 60 are freely rotatably mounted upon planet carrier 57. Planet pinions 60 mesh with sun wheel 55 and with the internal toothing 61 of an outer ring gear 62 which is coaxially disposed relative to input shaft 21 and sun gear 55. A holding disk 63 axially secures sun gear 55 and planet pinions 60.

Correspondingly, upper sun gear 56 meshes with three upper planet pinions 64 which are freely rotatable on supporting bolts 65 and are, simultaneously, in meshing engagement with the internal toothing 61 of outer ring gear 62. Supporting bolts 65 engage bores 66 of an upper planet carrier 67 which carries freely rotatable output shaft 18 located in upper housing part 52. A holding disk 68 axially secures sun gear 56 and planet pinions 65. Outer ring gear 62 is freely rotatably mounted in indentations 69, 70 of planet carriers 57, 67. Input shaft 21, with shoulder 71, is rotatably supported in a central bore 72 of upper planet carrier 67. Outer ring gear 62 has an outer toothing 74. A spur gear 75 is connected for rotation with output shaft 19, and meshes with outer toothing 74. Output shaft 19 is rotatably mounted in housing parts 51, 52, in parallel relationship to output shaft 18 which is coaxial to input shaft 21. Pinions 16, 17 are connected output shafts 18, 19 with in a torque transmissible manner. Contact between threaded cables 13, 13', 14, 14' and pinions 16, 17 is maintained by way of cable guides 76, 77.

An axially extending through-slot 83, 84 or 85 is respectively disposed in radially projecting circumferential flange 80 of outer ring gear 62 and in circumferential flanges 81, 82 of planet carriers 57, 67, which, essentially, have identical diameters. Slots 83, 84, 85 are brought into axial congruence only at the point when cover 3 is fully tilted upwardly in its foremost position, i.e., assumes the position depicted in FIG. 2. FIG. 8 depicts the planet pinions 57, 67 and external gear 62 immediately before or after such positions have been assumed.

A shift lock 88 is axially displaceably mounted in axial cavities 86, 87, which are in alignment in housing parts 51, 52. The shift lock has two radially projecting lugs 89, 90. Lug 90, depending upon the axial position of shift lock 88, can be engaged with either slot 83 of external gear 62 of slot 84 of lower planet carrier 57 in order to provide blockage against rotational movement. Shift lock 88 also has a radially projecting cam 91 which has a notch 92 into which the free end of a leaf spring 93 protrudes. The other end of leaf spring 93 is secured to control button 95 by screw 94, which, by way of a bias spring 96, designed as a coil spring, is biased downwardly into the position depicted in FIG. 8. Control button 95 is axially displaceably disposed in a bearing bushing 97 which is inserted into a corresponding bore of lower housing part 51. At the underside of lower housing 51, there is a slider 99 that is guided via a dovetail guide 98 having a run-up slope 100 which engages the lower end of control button 95.

For the purpose of describing the functioning of distributor gear assembly 20, it is assumed that control button 95 and slider 99 are in the position depicted in FIG. 8, in which spring 93 biases shift lock 88 downwardly, but slots 83, 84, 85 are not yet in alignment with each other. Lugs 89, 90 position themselves against flanges 82 or 81 from above when cover 3 is tilted from the FIG. 1 closed position, to a position immediately before reaching the tilted position according to FIG. 2, wherein a displacement of the shift lock 88 is prevented and lug 90 engages slot 83 of external gear 62. During the turning of crank handle 22, planetary pinions 60, 64 move in rolling contact in outer ring gear 62, which has been prevented from rotating by shift lock 88. Planet carrier 67, and along with it, output shaft 18, is induced into a rotational movement by upper planetary pinions 64, which movement in contrast to the rotational movement of input shaft 21, for example, has a transmission ratio of 3:1. While outer ring gear 62 is blocked, the other output shaft 19 remains stationary. Cover 3 is tilted via threaded cables 13, 13', while it simultaneously is prevented from a longitudinal displacement motion by means of cables 14, 14'. At the moment in which the tilted position according to FIG. 2 is reached, and slots 83, 84, 85 are in alignment, spring 93 pushes shift lock 88 downwardly into a position in which lug 89 is under flange 82, and lug 90 is under flange 80. Lug 90 releases outer ring gear 62 and enters into slot 84 of planet carrier 57. If input shaft 21 continues to rotate after switchover of the distributor drive assembly, pinion 16, for example, is driven with a transmission ratio of approximately 8:1, and pinion 17 is driven with a transmission ratio of approximately 1:1. As a consequence, a relatively rapid sliding displacement movement of sliding carriage 12, as described above, with a simultaneous gradual tilting movement of lifting lever 4 is obtained, whereby cover 3 may be brought into the position in accordance with FIG. 3.

In order to subsequently bring cover 3 back into the closed position according to FIG. 1 from the open FIG. 3 position, the crank 22 is turned in an opposite direction after slider 99 has been shifted thereby causing control button 95 to be pushed upwardly as its end runs up the run-up slope 100 against the force of spring 96. Spring 93 now biases shift lock 88 for an upward axial movement, which movement is initially prevented by lugs 89, 90 resting against the bottom sides of flanges 80, 82. As soon as slots 83, 84, 85 are in alignment, in the FIG. 2 cover position, shift lock 88 snaps upwardly once again switching over the distributor gear assembly. External gear 62 is again blocked, while planet carrier 57 is released. Subsequently, cover 3 can be lowered from the tilt-out position of FIG. 2 into the closed position of FIG. 1.

Slider 99 can be replaced by one or several switching magnets which can be caused to respond either manually or automatically for reversing or changing over the distributor gear assembly. The gear assembly switchover point (tilted-out cover position in accordance with FIG. 2) can be selectively defined by a catch, e.g., a spring catch, or by a fixed stop. A fixed stop, if selected, has to be unlocked for further movement of the cover.

Figure 9:
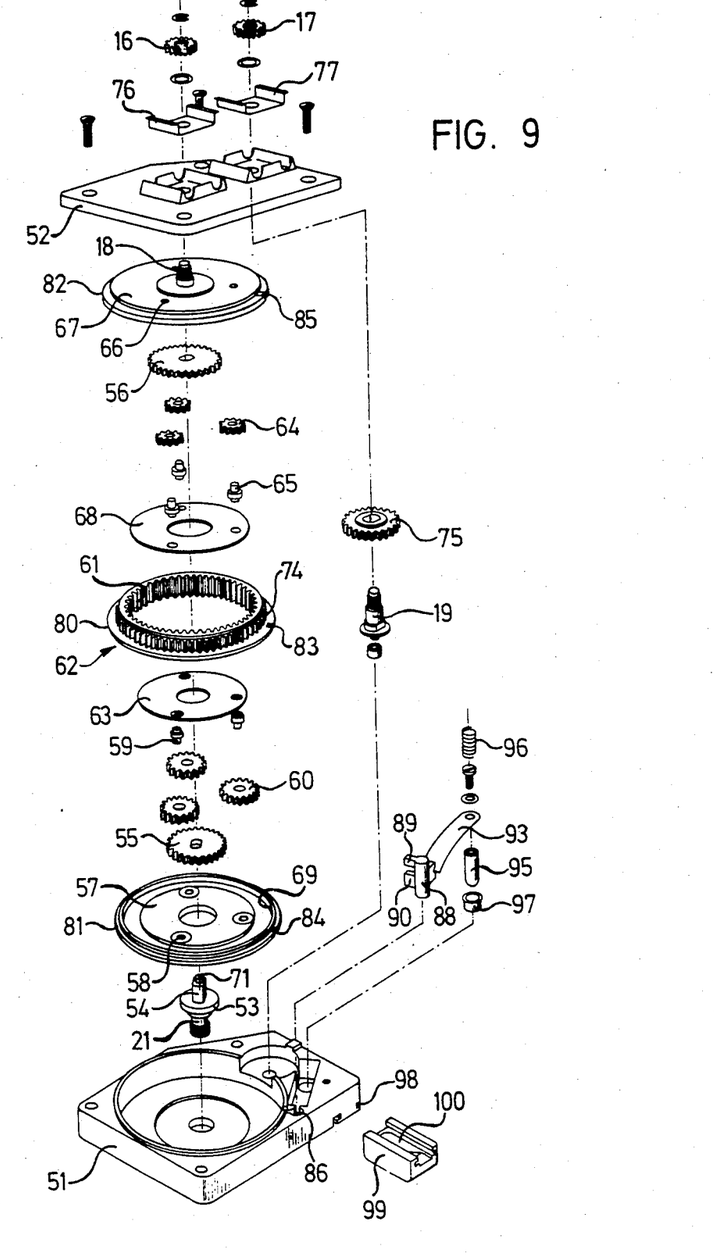
FIG. 9 is an exploded perspective view of the distributor gear assembly according to FIGS. 7 and 8.

The distributor gear assembly 20' provided in the roof, in accordance with FIGS. 4–6, may conform to the distributor gear assembly 20 previously described by way of FIGS. 7–9, except for a change in transmission ratios which are to be selected such that during the displacement of cover 27, planet carrier 67, and inherently, pinion 16, do not or almost do not, perform any rotational movements inbetween the positions which are in accordance with the FIG. 5 and FIG. 6 positions.

Figure 10:
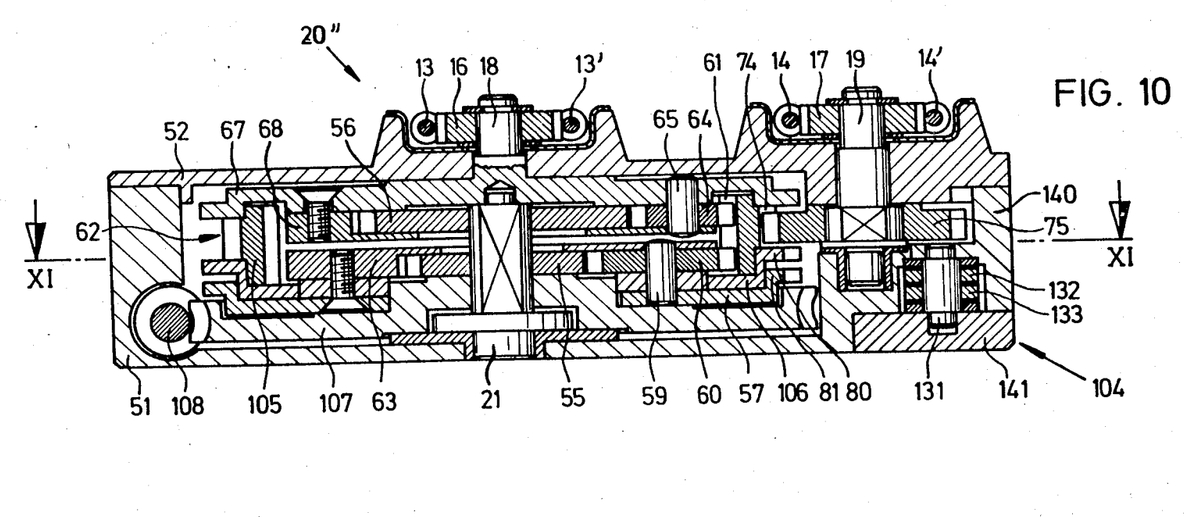
FIG. 10 is a cross-sectional view similar to that of FIG. 7, showing a motor drive distributor gear assembly.

Distributor gear assembly 20", according to FIG. 10 differs from the distributor gear 20 described in detail by FIGS. 9–7 only in that it is designed for interaction with a motor driven primary drive (instead of a hand crank drive), and in that it has an automatic reversing device, designated generally by reference numeral 104, and further depicted in FIGS. 11 to 14 (instead of the shift lock arrangement).

Distributor gear assembly 20'', in particular, like assembly 20, has a lower sun gear 55 and an upper sun gear 56 which are positioned on shaft 21 and are connected for rotation therewith. Lower sun gear 55 meshes with lower planet pinions 60, which are rotatably mounted at lower planet carrier 57 via supporting bolts 59. Correspondingly, upper sun gear 56 engages upper planet pinions 64 which are rotatably mounted on supporting bolts 65 of upper planet carrier 67. Planet pinions 60 and 64 mesh with the internal toothing 61 of an outer ring gear 62 which, in the embodiment depicted, comprises an annular gear 105 and a flanged ring 106 fixedly connected therewith. The outer toothing 74 of outer ring gear 62 meshes with spur gear 75 which, in turn, is connected with output shaft 19 carrying pinion 17 so as to be rotatable therewith. Upper planet carrier 67 is connected with output shaft 18, which has pinion 16 affixed thereto. In the area defined by housing parts 51, 52 there is, additionally, a worm gear 107, which is connected in a torque transmitting manner with shaft 21 and meshes with a worm shaft 108, which is rotatably mounted in lower housing part 51. Worm shaft 108 is driven by a drive motor, preferably an electric motor, not depicted. Two locking bolts 111, 112 (FIGS. 11, 13, 14) are disposed in proximity to the periphery of outer ring gear 62 and planet carrier 57 and are part of reversing device 104.

A respective arresting notch 113, 114 is disposed in peripheral flange 80 of outer ring gear 62, and flange 81 of planet carrier 57 of distributor gear assembly 20'', respectively. These arresting notches 13, 114 are peripherally defined by surface 115, extending substantially in a radial direction, and by an inclined plane 116. Correspondingly, locking bolts 111, 112 are displaceable in a substantially radial direction and have, respectively, at their ends facing the outer edge of outer ring gear 62 and lower planet carrier 57, a radially directed outer surface 117 and an inclined plane 118, which in each case extends in a direction which is complementary to inclined plane 116. The arrangement is designed such that, in the predetermined relative position of the gear elements, which corresponds to the FIG. 2 cover position, (i.e., cover 3 is in its foremost position and a fully tilted-out position), locking bolts 111, 112 are in radial alignment with arresting notches 113, 114 and are brought into locking engagement with them by bias springs 119, 120.

Figure 11:
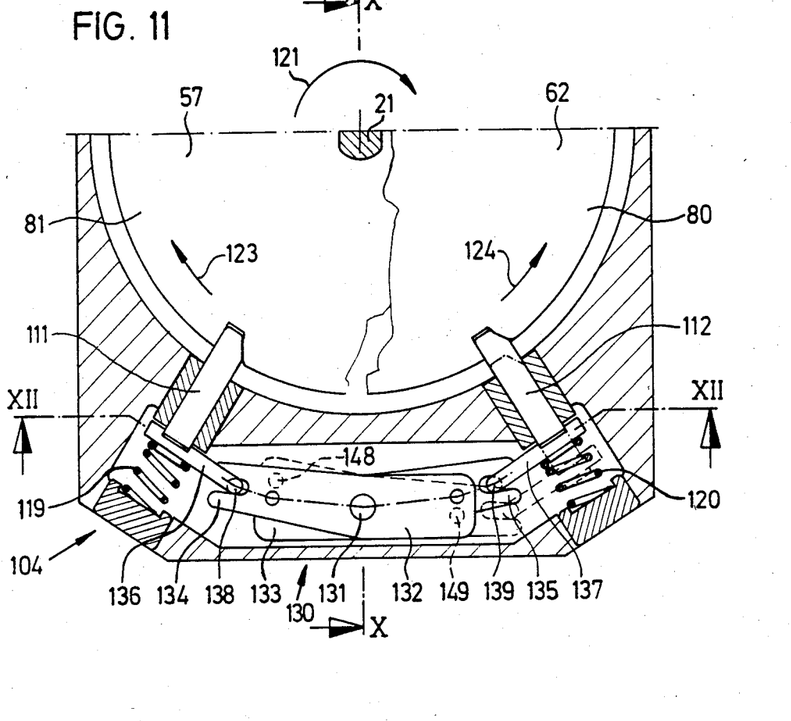
FIG. 11 is a partial schematic view of a partial section taken along line XI—XI of FIG. 10.
Figure 12:
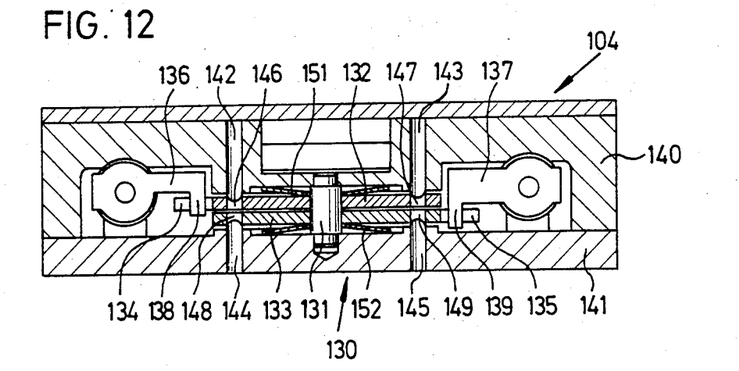
FIG. 12 is a sectional view taken along line XII—XII of FIG. 11.

When the cover is to be closed, starting from the FIG. 2 position, i.e., is to be brought into the position depicted in FIG. 1, shaft 21 in FIG. 11 rotates clockwise (arrow 121). Such rotation of shaft 21 attempts to rotate planet carrier 57 clockwise (arrow 123 in FIG. 11) and attempts to rotate external gear 62 in a counter-clockwise direction (arrow 124). The interaction of inclined planes 116, 118, of lock bolts 111 and arresting notch 114 of planet carrier 57, respectively, causes lock bolt 111 to be forced out of its locked FIG. 11 position against the force of a bias spring 119 until the planet carrier 57 is released for rotational movement. On the other hand, radial surface 115 of arresting notch 113 of external gear 62 presses against the outer, radially extending surface 117 of lock bolt 112, so that locking bolt 112 remains in the locked position depicted in FIG. 11 by solid lines, and outer ring gear 62 is blocked from rotational movement.

Figure 13:
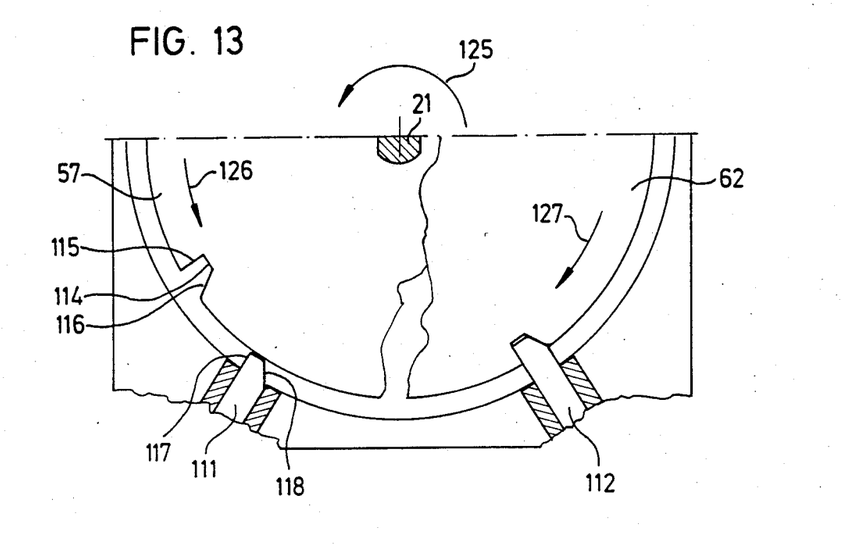
FIGS. 13-14 are partial sections corresponding to FIG. 11 for different operating positions.
Figure 14:
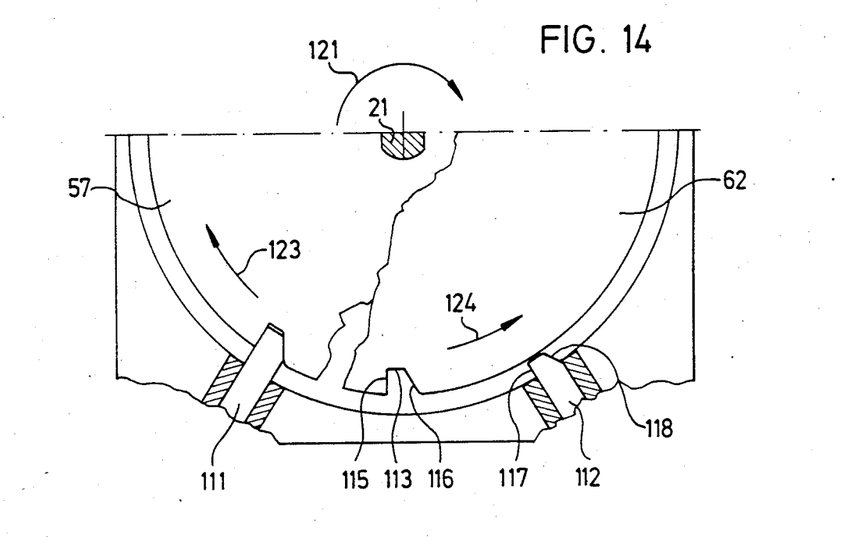

Once cover 3 has reached the closed position according to FIG. 1, planet carrier 57, external gear 62 and locking bolts 111, 112 assume the relative position depicted in FIG. 13. Subsequently, if cover 3 is again to be tilted, i.e., is to be moved in the direction of the FIG. 2 position, worm gear 10, along with shaft 21, are driven in the opposite direction (arrow 125 in FIG. 13) by worm shaft 108. Correspondingly, the rotational movements are reversed during which planet carrier 57 and outer ring gear 62 attempt to rotate (arrows 126, 127 in FIG. 13). In this case, lock bolt 111 has released planet carrier 57. Simultaneously, outer ring gear 62 by the interaction of inclined plane 116 and arresting notch 113 with the inclined plane 118 of locking device 112, attempts to cause disengagement of the lock bolt by overcoming the force of bias spring 120. In order to prevent such occurrence, a shift-lock device 130 (FIGS. 11 and 12) is provided.

Lock device 130 has two locking levers 132, 133, pivotably mounted around a common axis 131, which levers at their respective ends 134, 135 are bifurcated. Each locking bolt 111, 112 is firmly connected to a respective diagonally projecting arm 136, 137 which, by way of a lug 138, 139, engages a slot formed by the bifurcated ends 134, 135. Pinshaped locking elements 142, 143, and 144, 145, respectively, are firmly positioned in housing parts 140, 141. Locking members 142 to 145 are hemispherically rounded at their ends 132, 133, facing the locking levers. In the position depicted in FIGS. 11 and 12, in which both bolts 111 and 112 are locked, the ends of locking elements 142 to 145 engage recesses 146, 147, 148 or 150 of lock elements 132, 133, located on opposite sides of axis 131, whereby lock levers 132, 133 are axially centered with respect to the axis 131 with regard to the hemispherical ends of locking elements 142 to 145, by way of leaf springs 151, 152.

During the transition from the FIG. 11 position to the position depicted in FIG. 13, locking bolt 111 is released from arresting notch 114, whereby arm 136 with its lug 138 induces a tilting movement of lock lever 132 about axis 131 in a counter-clockwise direction. During this tilting movement of lock lever 132, the ends of lock elements 142, 143 are forced out of the corresponding recesses 146, 147 as a consequence of lock lever 132, carrying along lock lever 133, being moved downwardly (FIG. 12) in the direction of axis 131, overcoming the force of leaf spring 152. This causes the ends of lock members 144, 145 to penetrate more deeply into recesses 148, 149 of lock lever 133. After lock lever 132 is fully tilted out of the FIG. 11 position, corresponding lock lever 133 is prevented from any tilting movement by lock members 144, 145 being held in recesses 148, 149 by the downwardly displaced lever 132. Consequently, lock lever 133, by way of arm 137, retains lock lever 112 in the locked position, when outer ring gear 62, starting from a position depicted at the top of FIG. 13, attempts to rotate in the direction of arrow 127.

When shaft 21 is rotated in the direction of arrow 125 (FIG. 13), starting from the FIG. 2 position of the cover, planet carrier 27 and outer ring gear 62 attempt to rotate in the direction of arrows 126, 127, but from the position shown in FIG. 11. Lock lever 111 remains locked, while lock lever 112, overcoming the force of bias spring 120, is forced out of arresting notch 114 by the interaction of inclined planes 116, 118. In the cover position according to FIG. 3, lock levers 111, 112, planet pinion 57 and outer ring gear 62 have reached the relative position depicted in FIG. 14.

If, starting from the FIG. 3 position, cover 3 is to be moved in the direction of the position depicted in FIG. 2, shaft 21 is rotated in the direction of arrow 121 (FIG. 14), and induces planet carrier 57 and outer ring gear 62 to attempt rotational movements in the direction of arrows 123, 124. The lock lever 112 is fully released now, so that outer ring gear 62 may be rotated without impedance. The disengagement of lock bolt 112 causes arm 137 and lock lever 133 to be positioned as indicated by broken lines in FIG. 11, whereby lock lever 133, and along with it, lock lever 132, are moved upwardly, overcoming the effects of leaf spring 151 in FIG. 12, which makes a tilting of lock lever 132 impossible. Consequently, lock lever 133 secures lock bolt 111 in the locked position depicted in FIG. 14 so that planet carrier 57 is retained in place.

Figure 15:
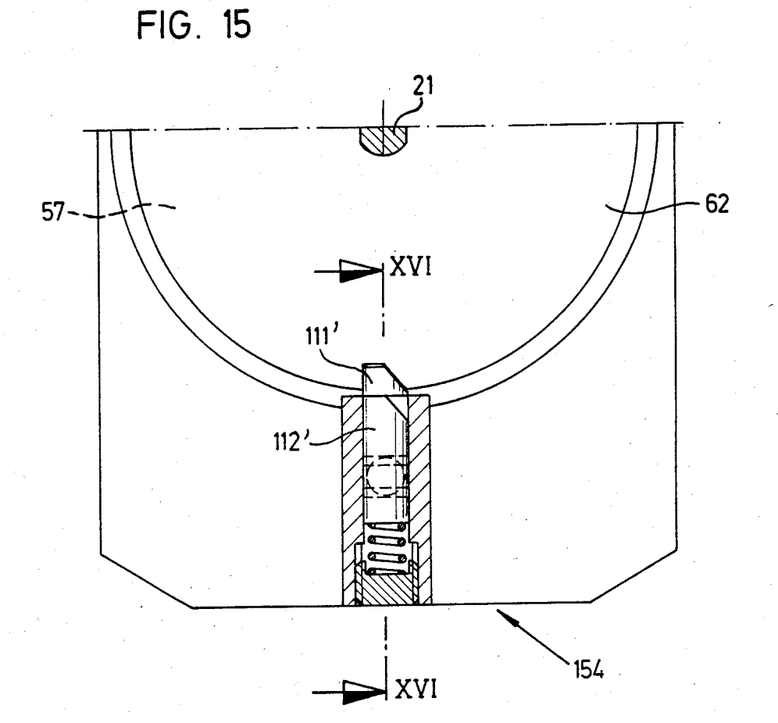
FIG. 15 is a section similar to FIG. 11 showing a modified reverse locking device.
Figure 16:
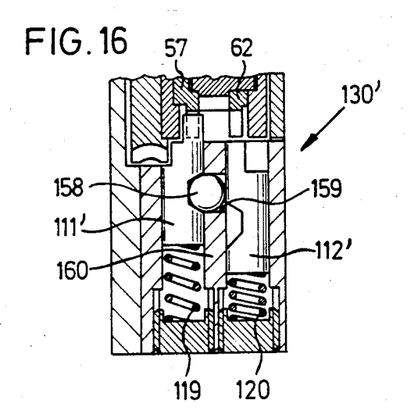
FIGS. 16 and 17 are partial sections taken along line XVI—XVI of FIG. 15 for various positions of the lock bolts.
Figure 17:
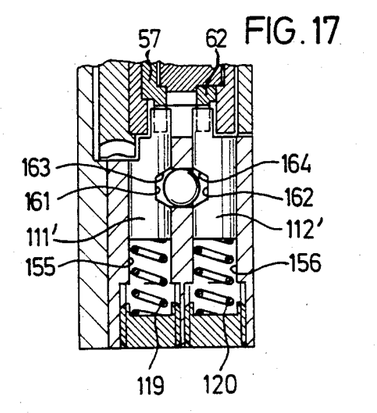

A modified version of the reversing device generally designated 154 in FIGS. 15–17, substantially corresponds structurally and functionally to the device shown in FIGS. 11–14. Spring-biased lock bolts 111' and 112' correspond to lock bolts 111, 112, previously discussed, and cooperate with planet carrier 57 or outer ring gear 62, respectively. In a departure from the embodiment discussed above, lock bolts 111', 112' are disposed in guide channels 155, 156, extending parallel to each other, and arresting notches 113, 114 are radially aligned in a relative position corresponding to the FIG. 2 cover position, as can be seen from FIG. 17. Shift lock device 130' correspondes functionally to shift lock device 130 in the preceding embodiment and essentially consists of a spherical lock member 158 which is supported in an opening 159 of a partition wall 160 separating guide channel 155 from guide channel 156 such that, as a function of a sliding motion of lock bolt 111', 112', the lock member performs a movement which is normal to the moving direction of the locking bolt. The diameter of lock member 158 is greater than the thickness of partition wall 160, so that lock member 158 projects above either one or both sides of partition wall 160, whereby the projecting portion of lock member 158 can be accepted by a recess 161 and/or recess 162 of lock bolt 111' or 112', respectively.

Recesses 161, 162, at a minimum at the side closest to planet carrier 57 or outer ring gear 62, are defined by an inclined plane 163, 164. Thus, if, for example, lock bolt 112' is moved from arresting notch 113, starting from the FIG. 17 position, inclined plane 164 contacts locking member 158 and forces it out of recess 162, whereby locking member 158 penetrates deeper into recess 161 of the other lock bolt 111' (FIG. 16). In this manner, disengagement of locking bolt 111' is prevented when locking bolt 112 is released. The same applies in the reverse case, when locking bolt 111' departs from its locked position first. In this case, locking member 158 places itself into recess 162 and retains locking bolt 112'.

If the arrangement is such that, in the range of the tilting movement of cover 3, between the FIGS. 1, 2 and 3 positions, planet carrier 57 and/or outer ring gear 62 execute a rotational movement of more than 360 degrees, planet carrier 67 likewise can be provided with arresting notches in the manner of the example shown in FIGS. 7–9, which notches permit engagement of locking bolts 111, 112, 111', 112', respectively, only in the FIG. 2 cover position. In all other cover positions, such locking is prevented by planet carrier 67.

While we have shown and described various embodiments in accordance with the present invention, it is understood that the same is not limited thereto, but is susceptible of numerous changes and modifications as known to those skilled in the art, and I, therefore, do not wish to be limited to the details shown and described herein, but intend to cover all such changes and modifications as are encompassed by the scope of the appended claims.

We claim:

1. Vehicle roof having a cover arrangement which covers a roof opening in its closed position, the positioning of the cover arrangement being adjustable by an actuating mechanism having a minimum of two synchronized members with differing speed ratios, connected to a single primary drive, wherein a reversible distributor gear assembly operatively interconnects the primary drive with the cover arrangement, said distributor gear assembly having a plurality of gear elements, an input shaft and at least two output shafts, said distributor gear assembly being operative, via said gear elements and based upon the relative position of at least one of the gear elements of the distributor gear assembly, to drive said output shafts, either singly, or together with differing transmission ratios.

2. Vehicle roof according to claim 1, wherein the distributor gear assembly comprises a planetary gear arrangement.

3. Vehicle roof according to claim 2, wherein the planetary gear arrangement of the distributor gear assembly comprises a dual epicycling gear with two coaxial sun wheels and two groups of planet pinions, each of which is freely rotatably mounted to a respective planet carrier.

4. Vehicle roof according to claim 3, wherein both sun wheels are positively connected with the input shaft for rotation therewith and one of the output shafts is coaxially disposed with respect to the input shaft and is connected for rotation with the planet carrier of one of the planet pinion groups.

5. Vehicle roof according to claim 4, wherein the planet pinions of both planet pinion groups mesh with an inner toothing of an outer ring gear that has an inner and an outer toothing and is arranged coaxially with respect to the sun wheels; and wherein the other output shaft is driven from the outer toothing of the outer ring.

6. Vehicle roof according to claim 3, wherein the planet pinions of both planet pinion groups mesh with an inner toothing of an outer ring gear that has an inner and an outer toothing and is arranged coaxially with respect to the sun wheels; and wherein one of the output shafts is driven from the outer toothing of the outer ring.

7. Vehicle roof according to claim 5, wherein a spur gear meshes with the outer toothing of the outer ring gear, said spur gear being connected with the other output shaft in a torque transmitting manner.

8. Vehicle roof according to claim 6, wherein a reversing device is provided for alternatively blocking the rotation of the outer ring gear and the planet carrier of the outer planet group.

9. Vehicle roof according to claim 7, wherein the reversing device has a locking device which, at predetermined rotational positions of the outer ring gear with respect to the planet pinion carrier of the other planet group is selectively engageable with locking elements of either of the outer ring gear and planet carrier of the other planet pinion group.

10. Vehicle roof according to claim 8, wherein operation of the distributor gear assembly is manually reversable.

11. Vehicle roof according to claim 4, further comprising a reversing device for automatically enabling the operation of the distributor gear assembly to be reversed, when reaching a predetermined relative gear position.

12. Vehicle roof according to claim 11, wherein the reversing device has two locking bolts which automatically lock in the predetermined relative gear position for blocking movement of the two output shafts; and wherein each of the locking bolts is automatically released from a locked position, by actuating the primary drive in in selective directions when the gear elements are in respective predetermined relative positions.

13. Vehicle roof according to claim 12, wherein the locking bolts are spring biased for engaging respective arresting notches of the outer ring gear and planet carrier of the other planet pinion group.

14. Vehicle roof according to claim 13, wherein the locking bolts and arresting notches have cooperating inclined planes which push the respective locking bolt out of its arresting notch against the force of the spring biasing when the gear elements are in said respective predetermined relative positions and the primary drive is actuated in a direction corresponding to a given displacement direction of the respective output shaft.

15. Vehicle roof according to claim 13, wherein a switch-lock arrangement cooperates with the locking bolts in a manner that, upon disengagement of one of the two locking bolts, prevents a release of the respective other locking bolt.

16. Vehicle roof according to claim 15, wherein locking bolts are disposed in respective guide channels that extend parallel to each other and are separated from each other by a partition wall and wherein a locking member is mounted in an opening of the partition wall, said locking member being movable in a direction normal to that of the locking bolts as a function of the displacement of the locking bolts, and the size of the locking member in the direction normal to the moving direction of the locking bolts being greater than the thickness of the partition wall, and wherein both locking bolts have a recess into which the locking member can be received for blocking movement of the respective locking member and simultaneously releasing the other locking member.

17. Vehicle roof according to claim 16, wherein the locking member has a spherical shape.

18. Vehicle roof according to claim 16, wherein the recess of each locking bolt, at a minimum, on the side closest to the gear elements, is defined by an inclined plane which pushes the locking member from the recess during the displacement of the locking bolt from the locked position toward the released position.

19. Vehicle roof according to claim 15, wherein the lock bolts are offset in the peripheral direction of the outer ring gear and the planet carrier of the other planet pinion group, and are coupled with respective locking levers, each of the locking levers being pivotably about a common axis after being deflected by a limited amount in the axial direction of said axis and wherein lock elements are provided which, upon deflecting of one of the two lock levers, are automatically brought into engagement with the respective other lock lever, preventing it from a pivoting movement.

20. Vehicle roof, according to claim 1, having a cover which is tiltable by means of a tilting device and is slidably displaceable by way of a displacement device, wherein the tilting device is operatively connected with one of the output shafts, and the displacement device is operatively connected with another of the output shafts.

21. Vehicle roof, according to claim 5, having a cover which is tiltable by means of a tilting device and is slidably displaceable by way of a displacement device, wherein the tilting device is operatively connected with one of the output shafts, and the displacement device is operatively connected with another of the output shafts.

22. Vehicle roof according to claim 1, wherein one of the output shafts is operatively connected with a first cover part and another of the output shafts is operatively connected with a second cover part.

23. Vehicle roof according ot claim 5, wherein one of the output shafts is operatively connected with a first cover part and another of the output shafts is operatively connected with a second cover part.

* * * * *